Nov. 8, 1938.　　　　　H. R. DICKINSON　　　　2,136,281
APPARATUS FOR RECOVERING OZOCERITE
Filed Oct. 16, 1934　　　2 Sheets-Sheet 1
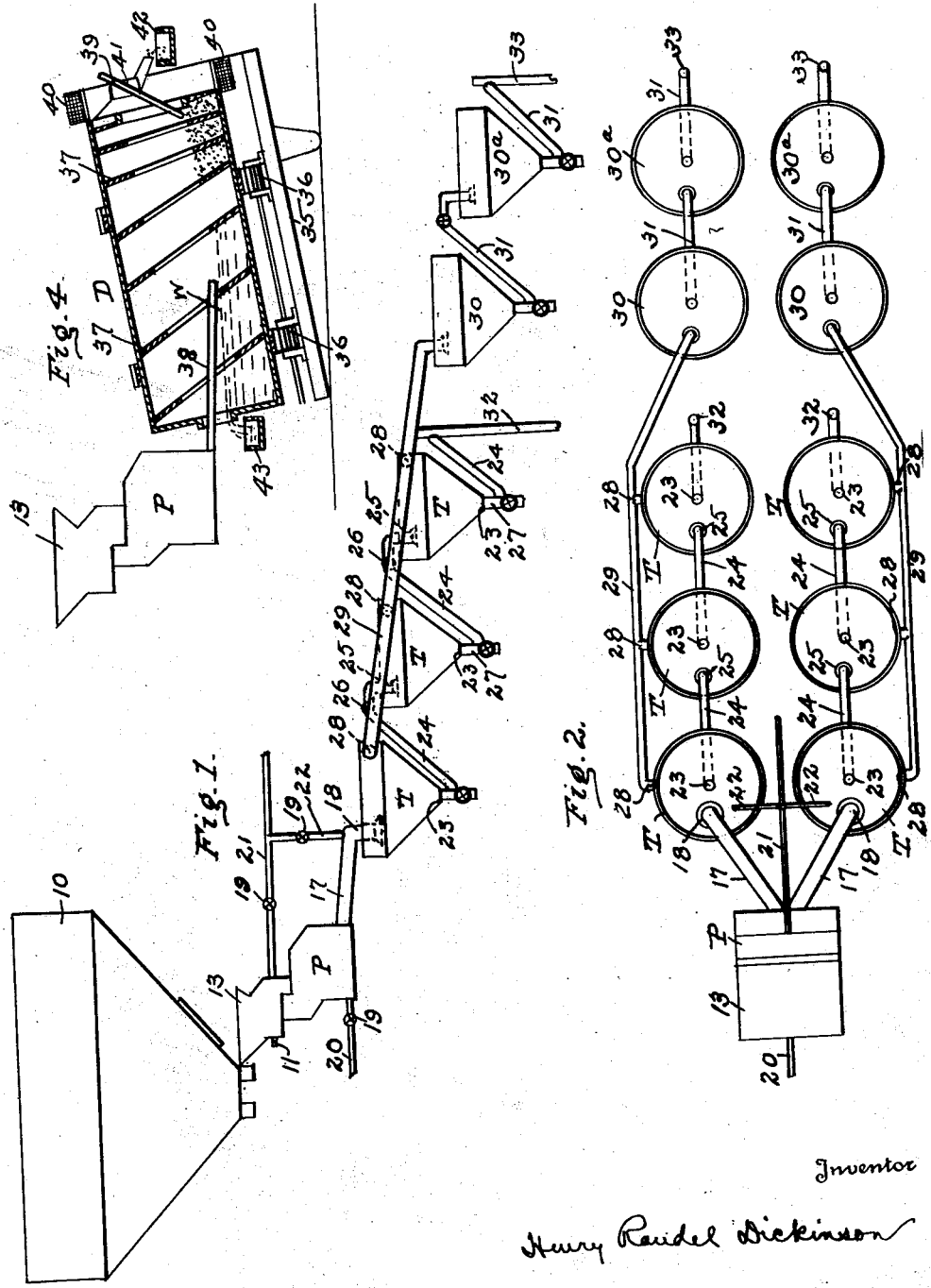
Inventor
Henry Rendel Dickinson
By　　　　　　Attorney Nov. 8, 1938.  H. R. DICKINSON  2,136,281
APPARATUS FOR RECOVERING OZOCERITE
Filed Oct. 16, 1934  2 Sheets-Sheet 2
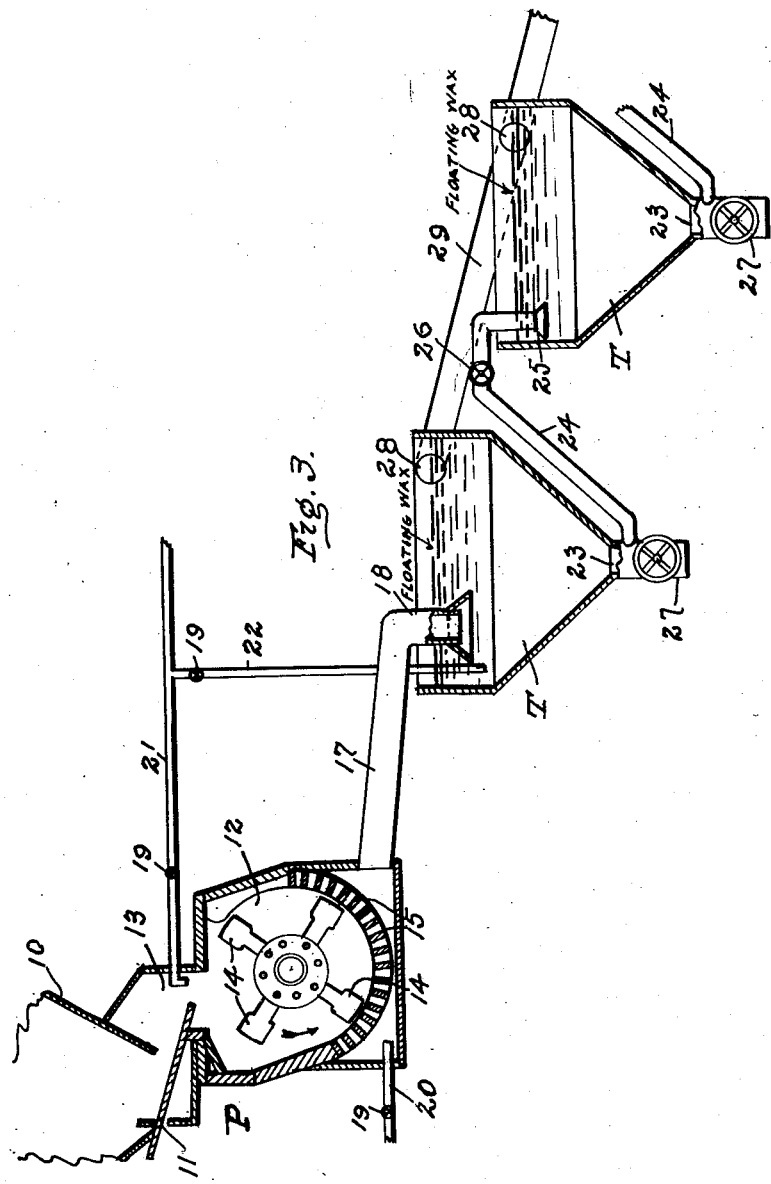
Inventor
Henry Randel Dickinson
By Wm. D. Hodges
Attorney Patented Nov. 8, 1938

2,136,281

UNITED STATES PATENT OFFICE 2,136,281

APPARATUS FOR RECOVERING OZOCERITE

Henry Randel Dickinson, Grand Rapids, Mich.

Application October 16, 1934, Serial No. 748,553

7 Claims. (Cl. 83—93)

This invention is an apparatus for treating ozocerite ore in such manner as to efficiently separate and recover a maximum amount of ozocerite from a given quantity of ore.

Heretofore, the most commonly practiced method of recovering ozocerite from its ore, associated rocks and other impurities has been to bring the raw material into association with hot water at a temperature above the melting point of the ore, in a trough or vat. The pure ozocerite which separates from the rocks and other undesirable impurities, being lighter than water, naturally floats to the top and is skimmed off of the surface of the water in any desired manner. The rest of the material is then subjected to further soaking in a "digester," in which separation is supposed to take place in approximately three layers, consisting of the melted ozocerite at the top, the rock and heavier materials at the bottom, and an intermediate layer consisting of a mixture of the two with water. After the melted material has been skimmed off the top of the water, the heavier particles comprising the lowest layer are discarded, and the contents of the intermediate layer are again subjected to the previously described treatment, along with new untreated material. The cost of this method is high and the efficiency thereof is very low, because the melted ozocerite clings very tenaciously to the rock and other foreign materials which settle out during the process, resulting in a very high percentage of loss of ozocerite originally contained in the ore. Another method involves the use of solvents, but this method is also objectionable because of the fire hazard involved in the use of highly volatile solvents, and is expensive in that the proportion of recovery is low compared to the cost involved.

One of the objects of the present invention is to provide a simple form of apparatus by means of which ozocerite ore and its accompanying rock and other undesirable materials mixed therewith, may be brought into association with cold water, in such manner that gravitational separation is effected by reason of the differences in specific gravity of the ozocerite and the other materials mixed therewith, with respect to cold water. A further object is to provide an apparatus of the character mentioned, including a plurality of flotation or gravitational separating tanks connected in series in such manner as to provide a continuous flow of material from one tank to another, and at the same time maintain an approximately constant depth of water in each tank, means being provided for imparting a certain amount of turbulence to a mixture of cold water and the raw material to be treated, as they pass into the first tank of the series, and also as they pass from one tank to another. A further object is to provide means for pulverizing the ore and materials normally associated therewith, and depositing the ground or pulverized material into a stream of water travelling to one or more receptacles designed for gravitational separation, each of which is capable of maintaining the material therein for a sufficient length of time to effect the desired gravitational separation of the ozocerite from the rest of the ground materials.

The invention will be hereinafter fully set forth and particularly pointed out in the claims.

In the accompanying drawings:—

Figure 1 is a side elevation illustrating an apparatus constructed in accordance with the invention. Figure 2 is a top plan view thereof. Figure 3 is an enlarged vertical sectional view illustrating a portion of the apparatus. Figure 4 is a longitudinal sectional view illustrating a slight modification.

Referring to the drawings, 10 designates a storage bin, which may be of any desired form or construction, the form shown for purposes of illustration having an automatic feeder conventionally illustrated at 11. Located adjacent to said bin, and in a lower plane is a grinding or pulverizing machine P, which may be of any well known or preferred type, provided that it is capable of grinding or pulverizing ozocerite ore, together with its associated rock and other undesirable impurities. In the drawings for the purpose of illustration and without intent to limit the invention, a pulverizing mill of the hammer type is shown, being provided with the usual pulverizing chamber 12, which is supplied from a hopper 13, in communication with the bin 10. The grinding or pulverizing function is effected in a well-known manner by means of rotating pivotally supported hammers 14, acting against separated grids 15, the material as it is pulverized falling through the spaces between the grids into a trough 16.

The trough 16 communicates with a conduit 17, having a downturned discharge end 18, extending into a gravitational separation tank T. A pipe 20 connected with a water supply (not shown), under any desired pressure, is so located as to project a stream of water across said trough, and into and through the conduit 17, in such manner as to carry the pulverized material with it, and to set up a certain amount of turbulence during the travel of the mixture through said conduit. The pulverizing may be effected while the material is dry, but if desired water may be mixed with the raw material before grinding, by means of a pipe 21, connected with a suitable source of supply (not shown). The tank may be initially supplied with water through branch pipe 22, and all of said water pipes are provided with suitable controlling valves 19, as shown.

Any desired number of tanks T may be employed, two series of such tanks being shown for purposes of illustration. Inasmuch as all of these tanks are of similar construction, a description of one will suffice for all. Each tank T may be of any desired shape and of any suitable or desired material, each one being provided at its bottom with an outlet 23, connected with a discharge pipe 24 leading upwardly therefrom, and having a downturned discharge end 25 projected into the next adjacent lower tank. It is preferred however, to provide a tank having a bottom wall which converges to the outlet 23, so as to direct all outflowing contents, without interruption to said outlet. The discharge pipe 24 is controlled by a suitable valve 26, and the tank is provided at its bottom with a trap 27 in register with said outlet 23, controlled by a suitable valve, and through which the tank may be flushed for removal of sludge and other accumulations which might tend to interfere with the operation of the apparatus. The discharge end 18 of the conduit 17, and the discharge ends of the respective pipes 24 are all located below the normal water level within the respective tanks into which they discharge.

Each tank is also provided with an overflow opening 28, at a level to permit the floating off of ozocerite as it accumulates on top of the water in the tank, said opening being connected with a conduit 29, which, in turn discharges into a settling tank 30. Any desired number of settling tanks may be employed, but for purposes of illustration two are shown, the bottom of the tank 30 being connected with the top of a similar tank 30a, by means of a pipe 31. It will be observed that each tank T of a series is in a lower plane than the next preceding tank, so that the water and pulverized materials will flow from one tank to another by gravity, due to the differences in elevation of the respective tanks. All of the tanks are initially filled with water by means of pipe 22, the water flowing from one tank to another until the desired water level is obtained in all tanks, after which the supply of water necessary to support the required flow depends upon that which is delivered by the pipe 20, plus that furnished by pipe 21, if the latter is employed. In any event the volume and velocity of flow of water through conduit 17 and the successive pipe 24 are so controlled that each tank T contains a body of water of approximately constant depth. The discharge pipe 24 of the last tank T of each series is connected with the waste pipe 32 through which the tailings are discharged. The discharge pipe of the last settling tank 30a leads to a suitable place of storage (not shown).

In practice, after the tanks T have all been initially filled with water, the ozocerite ore with its mixed rock and other associated impurities are fed to the pulverizer or mill P, and the material as pulverized is deposited into the trough 16, and is flush out of the trough and into the conduit 17 by means of the stream of water delivered from pipe 20. The force of the stream of water imparts a certain turbulence to the mixture of water and pulverized material during passage through said conduit 17, so that there is an initial separation of the fine particles of ozocerite from the heavier materials, due to the agitation of the mass before it reaches the first tank T. As the mixture of water and pulverized materials is delivered into the first tank T, the pulverized particles are deposited into the water below the surface thereof, so that a gravitational separation immediately commences, due to the rise to the surface of the lighter ozocerite particles and the settling of the heavier particles, the latter normally carrying with it ozocerite particles which cling to the heavier impurities. The ozocerite particles which rise to the surface of the water are floated off into the conduit 29 while the heavier particles are slowly settling to the bottom of the tank. Such heavier particles as may have settled to the bottom of the tank are then carried by the force of water flow, through conduit 24 and are delivered into the next tank, but at a level higher than that of its intake end, the passage of the mass being accompanied by a certain amount of turbulent agitation, due to having been taken from the bottom of one tank and delivered at a higher elevation to the next tank, which effects a further separation before the material is discharged from said conduit. The pure ozocerite which is floated off through the conduit 29 is delivered to the first settling tank 30, where the last traces of entrained dirt and other impurities are given a chance to settle to the bottom. The aforesaid settling action may be repeated in tank 30a, after which the recovered ozocerite is conveyed through pipe 33 to the storage location. The second tank 30a may be omitted if desired.

In the modification illustrated in Figure 4, gravitational separation of the ozocerite and its associated impurities is effected by means of a drum D, rotatively supported in an inclined position upon a base 35, and rotated in a well known manner by any suitable mechanism, which is conventionally illustrated at 36. The interior of the drum is provided with a common type of "screw flight" in the form of an helically arranged flange 37. The feed from the mill P is introduced into the drum by means of a discharge chute 38, the delivery end of which is about half way up the drum, and water is introduced through the upper open end by a pipe 39. As the drum rotates, the rock and other impurities settle, and with some water are moved away from the feed end by the screwflight 37 to the opposite and higher end of the drum. Here it is dewatered, caught in baskets 40, and discharged through a chute 41 into a conveyor 42. As the pulverized materials are moved upwardly by the screw flight, they are turned over and over and thoroughly agitated by the rolling action imparted by rotation of the drum, the agitation being normally sufficient to release substantially all of the pure ozocerite carried by the mass. The separated ozocerite floats back with the wash water as it accumulates at a normally constant level, indicated at w, and overflows at the lower or feed end, through the adjacent opening, being caught and conveyed away by a trough or other conveyor 43. The conveyor 43 preferably leads to a settling tank similar to that described in connection with the other figures, or the ozocerite and water may be immediately separated and the ozocerite deposited into bins for future use. The operation is subject to adjustments of speed of rotation, volume of water feed, depth of settling pool, variable take off and slope of the drum.

The advantages of the invention will be readily understood by those skilled in the art to which it belongs. For instance, it will be readily understood that by pulverizing or grinding the ozocerite ore, rocks and other associated impurities, all tendency of the ozocerite to cling to the rock and other impurities, as it does while in a melted condition under the hot water process, is entirely eliminated, and the great cost of maintaining an adequate supply of hot water, at a temperature to heat the materials to the melting point is done away with. A further advantage is that a great increase in the efficiency of the recovery of ozocerite is obtained at an infinitely smaller cost than by other known methods. It is to be understood that when "cold" water is referred to in this specification and in the appended claims, naturally cold water or "unheated" cold water is meant.

Having thus explained the nature of the invention, and described an operative manner of constructing and using the same, although without attempting to set forth all of the forms in which it may be made, or all of the forms of its use, what is claimed is:—

1. An apparatus for recovering ozocerite from its ore and associated impurities comprising a plurality of tanks arranged in series with each successive tank in a lower plane than the one which immediately precedes it, an outlet conduit leading from the bottom of each ank to the upper portion of the next succeeding tank, an inlet conduit for the first tank of the series, a grinding apparatus for ozocerite ore so disposed as to deposit pulverized ore into said inlet conduit, means for introducing a stream of water into said inlet conduit in such manner as to entrain and deliver the pulverized material to said first tank, said outlet conduits being so connected with their respective tanks that there is a continuous flow of water and pulverized particles from one tank to another, settling tanks, and means for conveying the floating ozocerite particles in all of the tanks to said settling tanks.

2. An apparatus for recovering ozocerite from its ore and associated impurities comprising a rotatively supported drum, means for rotating the same, means for introducing pulverized ozocerite ore into said drum at one end thereof, means for introducing a stream of water into said drum at the other end thereof, means for maintaining the drum in a longitudinally tilted position, so as to accumulate a body of water at the lower end thereof, means for effecting agitation of the pulverized material and water during rotation of the drum, means for conducting off outflowing water and the ozocerite floating thereon, and means for discharging the tailings from said drum.

3. An apparatus for recovering ozocerite from its ore and associated impurities comprising a rotatively supported drum, means for rotating the same, means for introducing pulverized ozocerite ore into said drum at one end thereof, means for introducing a stream of water into said drum at the other end thereof, means for maintaining the drum in a longitudinally tilted position, so as to accumulate a body of water at the lower end thereof, a screw flight within said drum so constructed and arranged as to agitate the pulverized material and water and to cause the pulverized particles to move toward the upper end of the drum, means at the lower end of the drum for conducting off outflowing water and floating ozocerite, means at the upper end of the drum for dewatering the tailings, and means for discharging said tailings.

4. In an apparatus for recovering ozocerite from its ores and associated impurities, means providing a tank for containing a body of water, said tank having a peripheral overflow opening near the top thereof, a supply conduit leading to said tank, means for introducing a stream of water and entrained ozocerite particles into said conduit, a discharge pipe leading from the lower portion of said tank and having its discharge end at a position above its inlet end, said supply conduit, said overflow opening and said discharge pipe being so relatively constructed, proportioned and arranged as to maintain water within said tank at such a level that a continuous natural gravitational overflow of surface water is discharged from the tank at the plane of the normal water level therein, and a continuous hydrostatic flow is maintained through said discharge pipe said supply conduit having its outlet end located at a substantial distance below the plane of the said overflow opening, so that the entrained ozocerite particles are caused to float upwardly through the water to the surface thereof by reason of their inherent buoyancy, and the heavier particles will fall to the bottom of the plane of the inlet end of said discharge pipe, so that the natural hydrostatic force applied to the water passing therethrough will entrain said heavier particles, and conduct them out of the tank the overflow opening being so positioned that the outflowing surface water will carry the buoyant ozocerite particles with it.

5. In an apparatus for recovering ozocerite from its ores and associated impurities, means providing a tank adapted to contain a body of water and having a peripheral overflow opening near the top thereof, a normally open supply conduit leading to said chamber, means for introducing a continuously flowing stream of water into said supply conduit, means for introducing pulverized ozocerite material into the stream of water as it flows through said supply conduit, a discharge conduit leading from the bottom of the chamber and having an outlet opening located at a higher level than that of the inlet end, so that turbulence is imparted to the stream of water passing from the chamber therethrough, said water introducing means, said overflow opening and said discharge conduit being so relatively proportioned, constructed and arranged as to maintain water within said tank at such a level that a continuous natural gravitational overflow of surface water is discharged from the tank at the plane of the water level therein, and a continuous hydrostatic flow is maintained through said discharge pipe, said supply conduit having its discharge end at a location a substantial distance below the plane of the overflow opening, so that the entrained ozocerite particles are caused to float upwardly through the water to the surface thereof by reason of their inherent buoyancy, and the heavier particles will fall to the plane of the receiving end of said discharge pipe, so that the natural hydrostatic force applied to the water passing therethrough will entrain said heavier particles in such manner that the turbulence of the outflowing water will effect supplemental separation of the ozocerite material, said overflow opening being so positioned that the outflowing surface water will carry with it the floating ozocerite particles.

6. In an apparatus for recovering ozocerite from its ores and associated impurities, means providing a tank having a peripheral overflow opening near the top thereof, a pulverizing apparatus for ozocerite ore, a trough located below the pulverizing apparatus in a position to receive pulverized ore as it is discharged therefrom, means for causing a stream of water to flow through said trough in such manner as to agitate and entrain the ore as it falls into said stream, a supply conduit leading from said trough to said tank, a discharge conduit leading from the bottom of the tank and having its outlet end located in a higher plane than that of its inlet end, said inlet conduit, said overflow opening and said discharge conduit being so relatively constructed, proportioned and arranged as to maintain water within the tank at such a level that a continuous natural gravitational overflow of surface water is carried off from the tank at the plane of the normal water level therein, and a continuous hydrostatic flow is maintained through said discharge pipe, the outlet end of said supply conduit being located a substantial distance below the plane of the overflow opening, so that the entrained ozocerite particles are caused to float upwardly through the water to the surface thereof by reason of their natural buoyancy, and the heavier particles will fall to the bottom of the tank, the inlet end of said discharge pipe being so positioned that said heavier particles will be entrained in the stream flowing through said discharge pipe, the overflow opening being so positioned that the outflowing surface water will carry the buoyant ozocerite particles with it.

7. An apparatus for recovering ozocerite from its ores and associated impurities, comprising a plurality of tanks arranged in a series, with each successive tank in a lower plane than its immediately preceding tank, each of said tanks having a peripheral overflow opening near the top thereof, an outlet conduit leading from the bottom of each tank except the last one and having its delivery end in the upper portion of the next succeeding tank, a supply conduit leading to the first tank, said supply conduit, said overflow openings and said discharge conduits being so relatively constructed, proportioned and arranged as to maintain water within all of said tanks at such a level that a continuous natural gravitational overflow of surface water is effected from each tank at the plane of the normal water level therein, and a continuous hydrostatic flow through the discharge conduits is maintained, the outlet end of said supply conduit being located at a substantial distance below the plane of the overflow opening of said first tank, and the outlet ends of each of the discharge conduits being located a substantial distance below the overflow opening of the tank into which it discharges, so that the entrained ozocerite particles are caused to float upwardly through the respective bodies of water to the surfaces thereof by reason of their inherent buoyancy, and the heavier particles will fall to the bottoms of the respective tanks, said overflow openings being so positioned that the outflowing surface water will carry the buoyant ozocerite particles with it, and a common means for collecting the overflowing surface water and the buoyant particles carried thereby.

HENRY RANDEL DICKINSON.